C. B. PECK.
DUST COLLECTOR.
APPLICATION FILED JULY 1, 1919.

1,344,146.

Patented June 22, 1920.
2 SHEETS—SHEET 1.

INVENTOR
Charles B. Peck,
BY John F. McCabe,
ATTORNEY

C. B. PECK.
DUST COLLECTOR.
APPLICATION FILED JULY 1, 1919.
1,344,146.
Patented June 22, 1920.
2 SHEETS—SHEET 2.
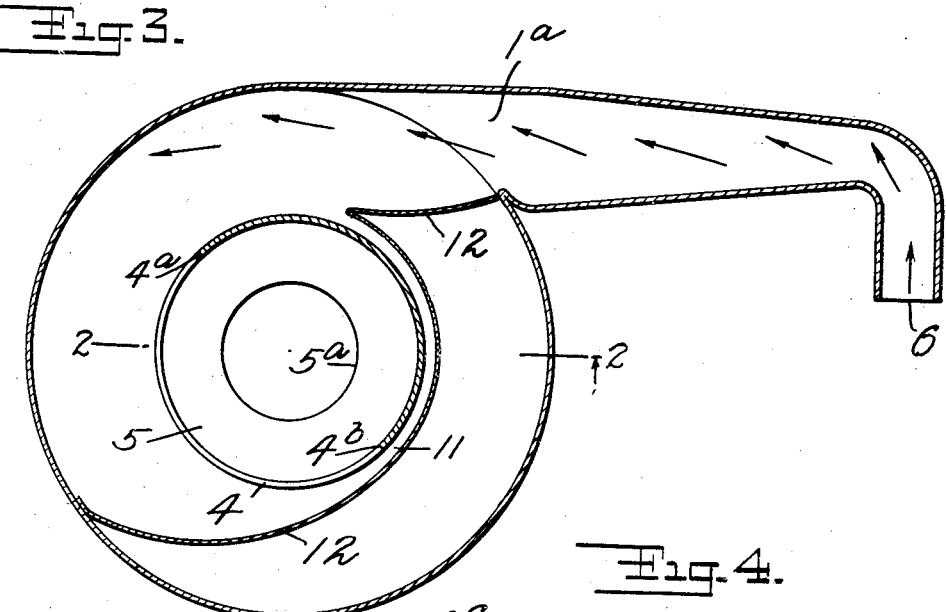
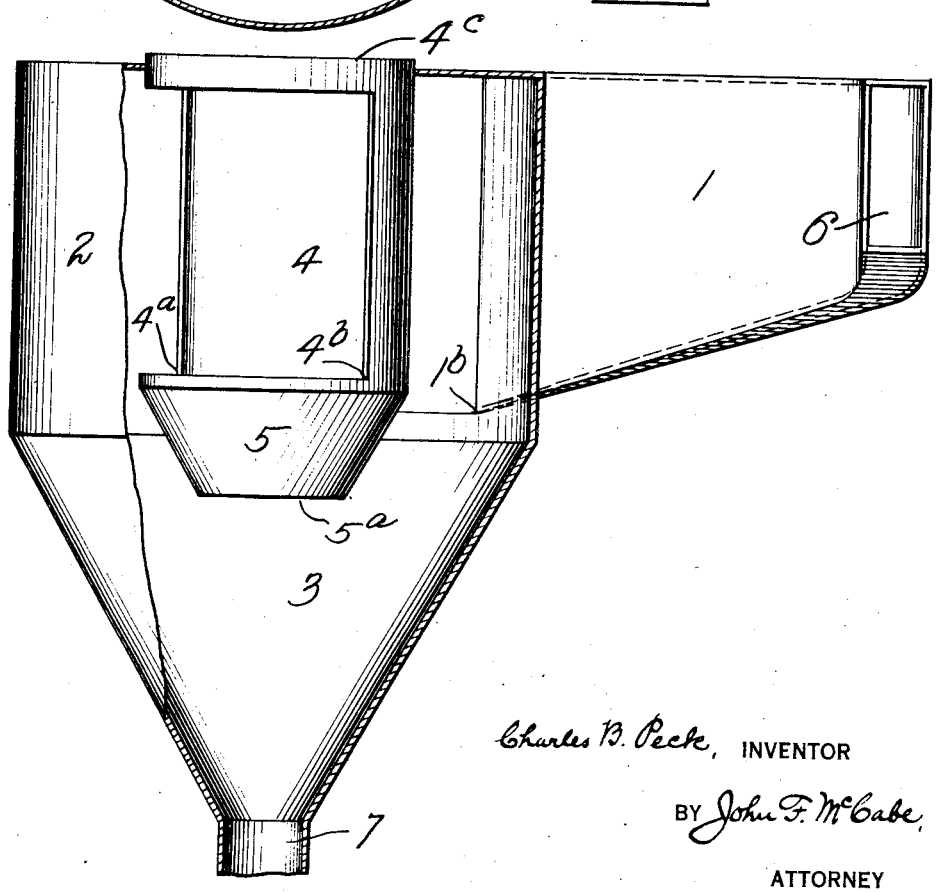
Charles B. Peck, INVENTOR
BY John F. McCabe,
ATTORNEY

UNITED STATES PATENT OFFICE.

CHARLES B. PECK, OF SUFFERN, NEW YORK.

DUST-COLLECTOR.

1,344,146.  Specification of Letters Patent.  Patented June 22, 1920.

Application filed July 1, 1919. Serial No. 307,913.

*To all whom it may concern:*

Be it known that I, CHARLES B. PECK, a citizen of the United States, and a resident of Suffern, New York, in the county of Rockland and State of New York, have invented a new and useful Improvement in Dust-Collectors, of which the following is a specification.

This invention relates to the class of dust-collectors or separators having a separating-chamber composed of a cylindrical portion above and a conical portion below, and in which a rotary motion is imparted to the dust-laden air current.

The invention relates to what is commonly known as a dust-collector or separator used for the purpose of separating chips, shavings, sawdust, emery wheel, cement and other fine dust from the air by which it is conveyed.

In such devices, as usually constructed, the dust-laden air enters the cylindrical chamber through an opening tangential to the cylinder. After entering, the air travels in a circular path and seeks an escape through the discharge pipe which extends down into the cylinder, the bottom of which is open, and the top extends through the center of the top or cover of the cylindrical chamber. While the dust-laden air is traveling in a circular manner, the centrifugal action, acting on the dust, carries it to the circumference of the cylinder and it falls to the bottom of the cone and is guided by that into a receptacle.

In the ordinary separator the dust-laden air is discharged into the cylindrical chamber without proper provision for gradual expansion. The abrupt expansion makes it impossible to regain the velocity pressure existing in the air. My invention provides a gradually expanding nozzle in the cylindrical chamber by means of which a portion of this velocity pressure is converted into useful static suction which relieves the back pressure commonly found at the inlet of the usual separator. At the same time the curvilinear form of this nozzle throws, by centrifugal action, the dust to the circumference of the cylindrical chamber, and the expansion having lowered the velocity of the air, the dust drops to the bottom of the cone while the air continues around the circumference of the chamber and thence escapes to the atmosphere through the discharge pipe.

The usual discharge tube is provided with an opening in the bottom or in the side at the bottom, which necessitates a sharp change in the direction of air flow creating a back pressure at this point. On the other hand, my invention further provides a new arrangement of outlet pipe so designed that the air enters the discharge pipe by an opening in the side, thus maintaining a movement of air in the separator entirely within one plane and eliminating the back pressure due to the change in the direction of air flow.

This new combination, as applied to dust separators, of a curving expanding nozzle, and side opening discharge pipe, permits the regain of a portion of the energy in the moving air, and permits the movement of air through the separator with the minimum power, and I claim these features as new and novel.

I am aware that it is not novel to use a cylindrical separating chamber and collecting cone and I do not claim them *per se*, but my invention is distinguished from all others in the expanding nozzle feature, the side opening outlet feature, and the general interior arrangement of the device so that the air travels practically in one plane.

In the accompanying drawings, which are to be taken as part of this specification, and in which I have shown merely a preferred form of the invention.

Fig. 3 represents a horizontal section of a modified form of the invention.

Fig. 4 is a vertical central section of such modified form.

The same reference characters indicate the same parts in all the figures.

Figure 1:
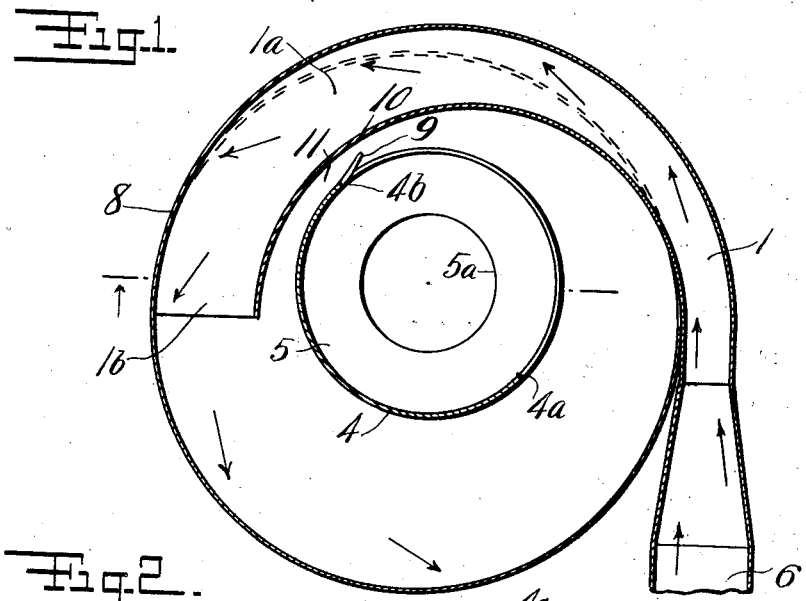
Figure 1 represents a horizontal section of a dust-collector constructed in accordance with my improvements.

Referring to the numerals on the drawings, there is shown and the preferred form of the invention, consists of an expanding nozzle 1, entering a cylindrical chamber 2, which is open at the bottom and terminates at its lower end in a conical bottom 3, and having a centrally-disposed vertical tube 4 projecting above the top of the chamber and extending a suitable distance within the body of the chamber. The said vertical tube may terminate at its lower end in a conical bottom 5. The tube may be open at both ends, and has on one side a suitable opening for the free passage of the air into the tube and thence out of the top to the atmosphere.

In Fig. 1 is shown a horizontal section, which brings out clearly the expanding nozzle 1 which enters the chamber tangentially and, following the outside edge 8 of the chamber, gradually and evenly expands horizontally and vertically until at $1^b$ it is nearly opposite the point of entrance on the other side of the chamber.

Figure 2:
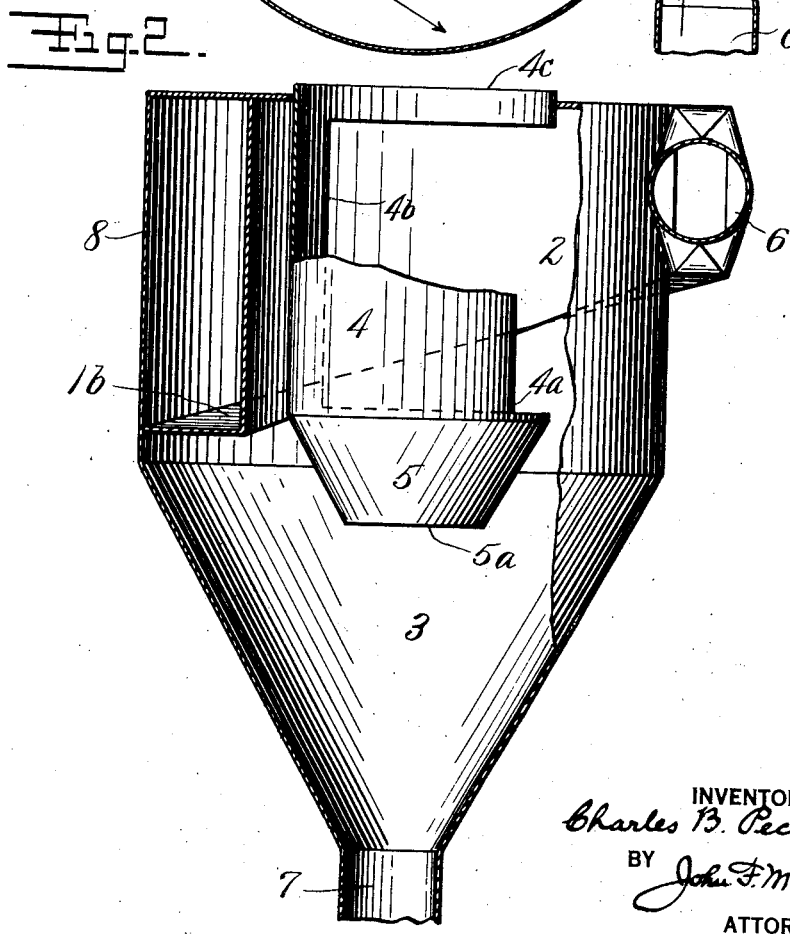
Fig. 2 represents a vertical central section.

The construction of the nozzle having a gradual expansion in height and width such as illustrated in Fig. 2 permits the air to gradually expand and at the same time that the air is expanded in the nozzle it is given a centrifugal action which throws the dust particles against the side wall 8, and against the outside circumference of the nozzle at about the point $1^a$, and at the point $1^b$, the velocity of the current being lowered by the expansion of the air, the dust carried falls to the bottom of the nozzle which is inclined toward the conical bottom, thence it drops into the collecting cone or receptacle 3 and by gravity is discharged through the aperture 7.

The air current continues to follow the line and enters the centrally disposed vertical tube 4 through the opening at one side and thence it continues up and out at the top at $4^c$.

In the preferred form of my invention this central tube 4, is open on one side as shown at $4^a$ and $4^b$ and this opening, as already explained, permits the air to enter the discharge pipe on the same plane that it is traveling in, thus maintaining a movement of air in the separator entirely in one plane. The central tube 4 is also placed in a tangent position to the expanding nozzle, and has a flange 9 at the point $4^b$. The flange may be adjustable to the condition of the work and may be placed as near the side wall 10 of the expanding nozzle as required by the conditions under which the device is working. Thus the size of the opening 11 between the nozzle wall at 10 and the flange 9 may be regulated, according to whether small or large particles are passing through the separator.

In Fig. 3 I have shown a modified form of the invention in which the expanding nozzle 1 is positioned outside the separating chamber 2. In this construction the interior arrangement of the separating chamber and the central tube 4 is modified to meet the changed conditions.

There is also shown in this figure a guard 12 which is tangent to the central tube 4, and is for the purpose of directing the air current around the cylindrical chamber in the direction of the opening in the side of the central tube.

In Fig. 4, there is shown a vertical central section of the modified form, but the guard 12 is not shown in this view in order that the central tube might better be displayed. The expanding nozzle may be placed in any convenient position and the air may pass through the expanding nozzle before passing through the curvilinear element, or vice versa.

I have hereinbefore described merely a simple and preferred form of my invention, but it will be understood that various modifications may be made in the arrangement and construction of the parts thereof without departing from the spirit and scope of my invention.

Having thus described the invention, I claim as new and desire to secure by Letters Patent,—

1. In a dust-collector, the combination with a cylindrical separating chamber and a collecting cone, of a nozzle of curvilinear form uniformly increasing in height and width to permit the gradual and regular expansion of air and at the same time to give the centrifugal force necessary to separate the dust-particles from the air current.

2. In a dust-collector, the combination with a cylindrical separating chamber and a collecting cone, of a nozzle of curvilinear form gradually increasing in height and width within the chamber to permit the gradual and regular expansion of air and at the same time give the centrifugal force necessary to separate the dust particles from the air current.

3. In a dust-collector, the combination with a cylindrical separating chamber and a conical bottom thereon, of an expanding nozzle having a discharge opening substantially of the height of said cylindrical chamber, and a discharge tube within said cylindrical chamber, said discharge tube having an opening substantially the height of the discharge end of the nozzle and at the same elevation so as to tend to stratify the air passing from the nozzle to the tube.

4. In a dust-collector, the combination with a cylindrical separating chamber and a conical bottom thereon, of an expanding nozzle having a discharge opening substantially of the height of said cylindrical chamber, and a discharge tube within said cylindrical chamber, said discharge tube having an opening substantially the height of the discharge end of the nozzle and at the same elevation so as to tend to stratify the air passing from the nozzle to the tube, said tube having an open converging bottom and an open top of greater dimension than the discharge opening of the nozzle.

5. In a dust-collector, the combination with a separating chamber and a collecting cone, of an expanding nozzle within the chamber and a vertical discharge tube leading from the chamber having an opening in one side of greater dimensions than the discharge end of the nozzle, the upper and lower edges of said opening being approximately in the same planes with the top and bottom of the nozzle, by means of which the movement of air in the head of the collector is approximately in the same plane.

In witness whereof I have hereunto set my hand this 30th day of June, 1919.

CHARLES B. PECK.

Witnesses:
VALENTINE TAYLOR,
CAROLINE A. TABOR.